(12) United States Patent
Walliser

(10) Patent No.: US 7,510,139 B2
(45) Date of Patent: Mar. 31, 2009

(54) ROTOR WING AIRCRAFT HAVING A BYPASSABLE RADIAL INFLOW TURBINE

(76) Inventor: Eric W. Walliser, 2715 N. Adair Cir., Mesa, AZ (US) 85207

( * ) Notice: Subject to any disclaimer, the term of this patent is extended or adjusted under 35 U.S.C. 154(b) by 194 days.

(21) Appl. No.: 11/265,361

(22) Filed: Nov. 2, 2005

(65) Prior Publication Data

US 2007/0095969 A1 May 3, 2007

(51) Int. Cl.
*B64C 27/22* (2006.01)
*B64D 35/00* (2006.01)
(52) U.S. Cl. .......................... 244/7 A; 244/60
(58) Field of Classification Search ............... 244/7 A, 244/17.11, 54, 55; 415/151, 206; 416/185
See application file for complete search history.

(56) References Cited

U.S. PATENT DOCUMENTS

| | | | | |
|---|---|---|---|---|
| 2,994,384 A * | 8/1961 | Stevens | ............. | 416/20 R |
| 3,159,360 A * | 12/1964 | Ryan et al. | .......... | 244/7 A |
| 3,517,898 A * | 6/1970 | Laville et al. | ............ | 244/7 R |
| 3,612,719 A * | 10/1971 | Nomura | ............ | 416/133 |
| 3,635,426 A * | 1/1972 | Stanley | ............ | 244/17.11 |
| 3,792,827 A * | 2/1974 | Girard | ............ | 244/7 A |
| 3,794,273 A * | 2/1974 | Girard | ............ | 244/7 A |
| 3,907,219 A * | 9/1975 | Pharris | ............ | 244/7 A |
| 3,986,686 A * | 10/1976 | Girard | ............ | 244/7 A |
| 4,530,640 A * | 7/1985 | MacInnes | ............ | 415/144 |
| 4,598,887 A * | 7/1986 | Jordan | ............ | 244/17.11 |
| 4,711,415 A * | 12/1987 | Binden | ............ | 244/17.19 |
| 5,174,523 A * | 12/1992 | Balmford | ............ | 244/17.11 |
| 5,328,131 A * | 7/1994 | Fodera et al. | ............ | 244/12.2 |
| 5,405,104 A * | 4/1995 | Pande | ............ | 244/7 A |
| 5,454,530 A | 10/1995 | Rutherford et al. | | |
| 5,503,351 A * | 4/1996 | Vass | ............ | 244/34 A |
| 5,730,582 A * | 3/1998 | Heitmann | ............ | 416/188 |
| 6,131,849 A * | 10/2000 | Nyhus | ............ | 244/17.11 |
| 6,244,537 B1 * | 6/2001 | Rutherford | ............ | 244/7 A |
| 6,435,453 B1 * | 8/2002 | Carter, Jr. | ............ | 244/8 |
| 6,513,752 B2 * | 2/2003 | Carter, Jr. | ............ | 244/8 |
| 6,543,718 B2 * | 4/2003 | Provost | ............ | 244/12.4 |
| 6,543,719 B1 * | 4/2003 | Hassan et al. | ............ | 244/17.13 |
| 6,789,764 B2 * | 9/2004 | Bass et al. | ............ | 244/10 |
| 6,885,917 B2 * | 4/2005 | Osder et al. | ............ | 701/3 |
| 7,275,711 B1 * | 10/2007 | Flanigan | ............ | 244/17.11 |
| 2004/0000614 A1 * | 1/2004 | Leyva et al. | ............ | 244/17.11 |
| 2007/0095970 A1 * | 5/2007 | Richardson | ............ | 244/7 A |

* cited by examiner

*Primary Examiner*—Michael R Mansen
*Assistant Examiner*—Joseph W Sanderson

(57) ABSTRACT

Aircraft including an airframe having a fuselage extending between a forward end and an aft end. The aircraft further includes a power plant mounted on the airframe producing exhaust during operation. The aircraft also includes a rotor/wing including a plurality of blades connected to a drive shaft rotatably mounted on the airframe and a radial inflow turbine mounted on the airframe in fluid communication with the power plant for receiving exhaust from the power plant. The radial inflow turbine includes a body forming an annular vortical chamber having an upper portion and a lower portion. The radial inflow turbine also includes a hub rotatably connected to the body and operatively connected to the drive shaft. In addition, the radial inflow turbine includes a plurality of vanes extending radially outward from the hub. The hub and the vanes are positioned in the vortical chamber.

7 Claims, 5 Drawing Sheets

ROTOR WING AIRCRAFT HAVING A BYPASSABLE RADIAL INFLOW TURBINE

BACKGROUND OF THE INVENTION

The present invention relates to aircraft and, more particularly, to rotor-wing aircraft having a bypassable radial inflow turbine.

The rotor/wings or blades of conventional rotary wing aircraft are frequently driven by a rotating shaft or mast that rotates about a generally vertical axis. The rotating blades and shaft cause a reaction torque that is frequently counter-balanced by smaller rotor blades mounted on the aircraft tail so they rotate about a generally horizontal axis. In other cases, the reaction torques are counter-balanced by having two counter-rotating main rotor blade sets. In order to avoid the problems associated with reaction torques, some rotary wing aircraft are reaction driven. That is, the rotor/wings are rotated by high-pressure gas exhausted from a trailing edge of each wing. Because reaction-driven aircraft are not shaft driven, significant reaction torques are not transmitted to the aircraft body. The gas delivered to each wing of a reaction-driven aircraft is typically created by a power plant (e.g., a gas turbine engine) mounted in the aircraft body and directed to the rotor/wing through the rotor mast.

Higher performance rotor-wing aircraft are sought. If reaction-drive rotor-wing aircraft are used, increasing performance generally requires increased exhaust mass flow rates and operating pressures. However, reaction-drive rotor-wing aircraft have significant system losses. Reaction-drive rotor-wing aircraft also require a relatively thick rotor mast and relatively large rotor blades to accommodate the exhaust passing through them during aircraft operation. In addition, heavy metal parts are required for transferring the high-temperature exhaust from the power plant to the blade tips. Further, the larger mast and blades increase aircraft weight and drag, requiring even larger power plants, which increase fuel usage and cost.

BRIEF SUMMARY OF THE INVENTION

The present invention relates to aircraft including an airframe having a fuselage extending between a forward end and an aft end. The aircraft further includes a power plant mounted on the airframe producing exhaust during operation. The aircraft also includes a stoppable rotor/wing including a plurality of blades connected to a drive shaft rotatably mounted on the airframe for providing thrust and/or lift for facilitating aircraft hover and/or forward flight. In addition, the aircraft includes a radial inflow turbine mounted on the airframe in fluid communication with the power plant for receiving exhaust from the power plant. The radial inflow turbine includes a body forming an annular vortical chamber having an upper portion and a lower portion. The radial inflow turbine further includes a hub rotatably connected to the body and operatively connected to the drive shaft. The radial inflow turbine also includes a plurality of vanes extending radially outward from the hub. The hub and the vanes are positioned in the vortical chamber.

Other aspects of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE INVENTION

Figure 1:
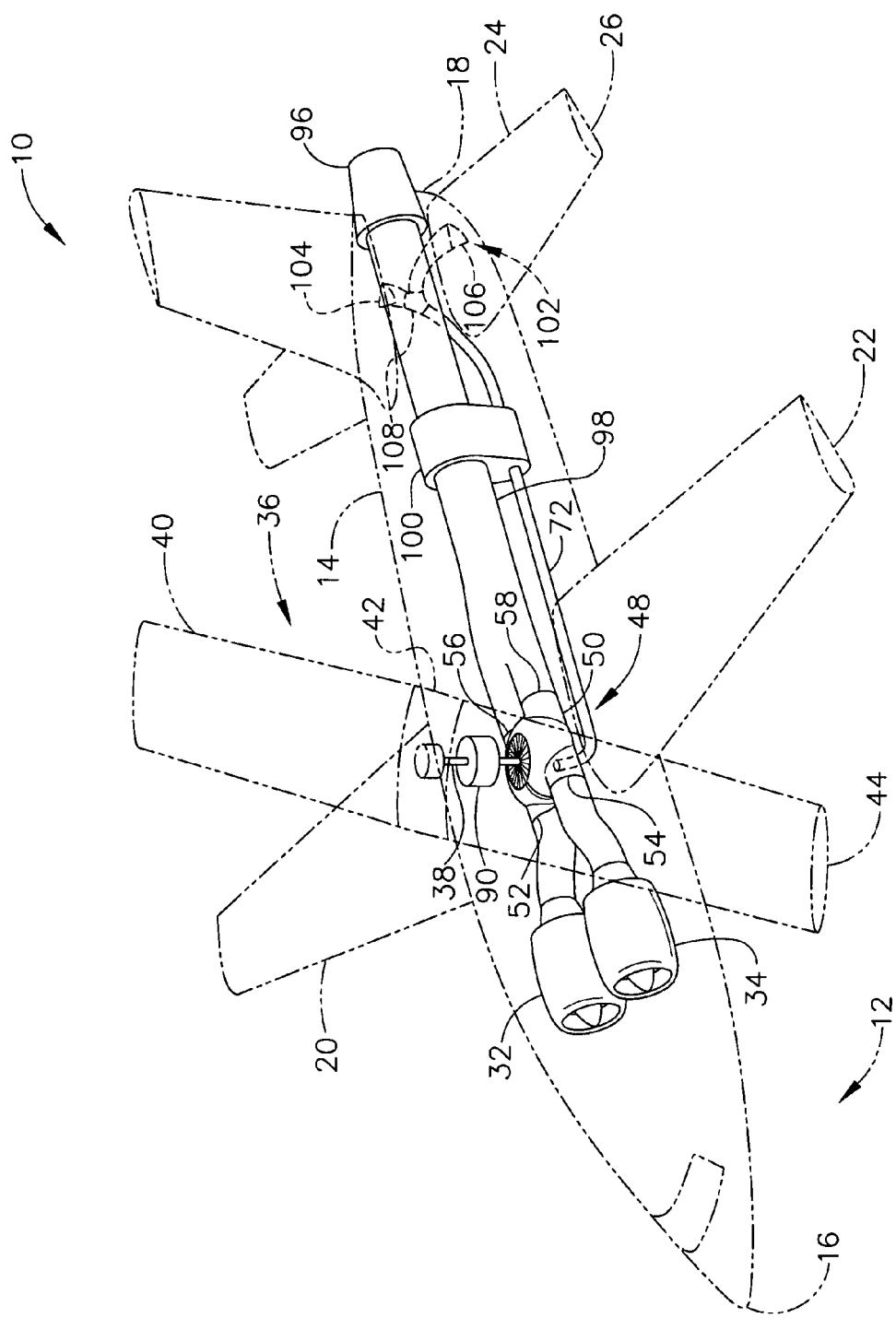
FIG. 1 is a perspective of an aircraft according to the present invention.

Referring to the figures, and more particularly to FIG. 1, aircraft according to the present invention is designated in its entirety by reference number 10. The aircraft 10 has an airframe, generally designated by 12, which includes a fuselage 14 having a nose or forward end 16 and a tail or aft end 18. Although the fuselage 14 may have other lengths extending between the forward end 16 and the aft end 18 without departing from the scope of the present invention, in one embodiment the fuselage has a length of between about 60 feet and about 70 feet. The aircraft 10 further includes at least two primary fixed wings or canards 20 extending laterally from the fuselage. Each primary fixed wing 20 has a wing tip 22 opposite the fuselage 14. Although the aircraft 10 may have other primary wingspans extending between the wingtips 22 without departing from the scope of the present invention, in one embodiment the aircraft has a primary wingspan of between about 35 feet and about 45 feet. The aircraft 10 also includes a rear set of fixed wings 24. Each rear fixed wing 24 has a wing tip 26 opposite the fuselage 14. Although the aircraft 10 may have other rear wingspans extending between the rear wingtips 26 without departing from the scope of the present invention, in one embodiment the aircraft has a rear wingspan of between about 30 feet and about 40 feet. The fixed wings 20, 24 may fold or pivot. For example, in one embodiment each of the fixed wings 20, 24 has a chord 28, 30 and the fixed wings are pivotally mounted on the fuselage 14 for selective movement between a forward flight position, in which the respective chord extends generally horizontally, and a vertical flight position, in which the respective chord extends generally vertically. The forward flight position of the fixed wings 20, 24 is shown by solid lines in FIG. 2 and generally indicated by reference arrow F and the vertical flight position is shown by dashed lines and generally indicated by reference arrow V. The fixed wings 20, 24 may also be moved to intermediate flight positions (not shown) between the forward and vertical flight positions wherein the respective wing chord 28, 30 is between horizontal and vertical.

As shown in FIG. 1, the aircraft 10 further includes one or more power plants 32, 34 mounted on the airframe. The power plants 32, 34 produce power in the form of hot high-pressure gas or exhaust during their operation. Although the power plants 32, 34 may produce other amounts of power without departing from the scope of the present invention, in one embodiment the power plants produce between about 11.00 pounds and about 13.00 pounds of thrust. Although other power plants 32, 34 may be used without departing from the scope of the present invention, in one embodiment each power plant is a F404 Turbofan available from General Electric Company of Cincinnati, Ohio. Although The aircraft 10 also includes at least one rotor/wing, generally designated by 36, rotatably mounted on the aircraft by way of a drive shaft 38. The rotor/wing 36 includes a plurality of blades 40 extending radially from a central hub 42 that is connected to the drive shaft 38 to a blade tip 44. In one embodiment, the rotor/wing 36 has two primary blades 40 extending from the hub 42 in opposite directions from each other. Although the blades 40 may have other lengths between the hub 42 and the respective blade tips 44, in one embodiment each blade has a length of between about 30 feet and about 35 feet. Because the blades 40 and the drive shaft 38 do not need to be configured for routing exhaust, the blades and drive shaft can be thinner and lighter than the blades and rotor mast of reaction-drive rotor-wing aircraft. The reduced weight and drag characteristics of the rotor/wing 36 improves aircraft 10 performance and lowers power requirements compared to reaction-drive systems. Although the blades 40 may have other maximum thicknesses 46 without departing from the scope of the present invention, in one embodiment each blade has a maximum thickness of between about 1 foot and about 2 feet. Although the rotor blades 40 may be made of other materials, in one embodiment at least a portion of the blades are made of a polymer composite.

The aircraft 10 has a rotary-wing mode wherein the rotor/wing 36 is rotated by the power plants 32, 34 and a fixed-wing mode wherein the rotor/wing is stopped and locked to prevent rotor/wing rotation. In the rotary-wing mode, the rotor/wing 36 rotates to provide upward thrust to the aircraft 10. The primary fixed wings 20 are moved to their vertical flight position V when the aircraft 10 is in the rotary-wing mode so the primary fixed wings minimally interfere with rotor 36 downwash and thus minimally inhibit the production of upward thrust by the rotor. The rear fixed wings 24 are also rotated to their vertical flight position when the aircraft 10 is in the rotary-wing mode so they minimally inhibit upward propulsion. In the fixed-wing mode, the rotor/wing 36 is stopped and locked so the blades 40 extend laterally to provide aerodynamic lift to the aircraft 10 during forward flight. The aircraft 10 may also fly at intermediate flight modes wherein the aircraft is propelled at an angle between vertical and horizontal. For example, an aircraft 10 transitioning between vertical and horizontal flight will fly at angles between vertical and horizontal. The fixed wings 20, 24 are moved to their forward flight positions F when the aircraft 10 is in the fixed-wing mode and can assume intermediate flight positions corresponding to intermediate flight modes.

Figure 3:
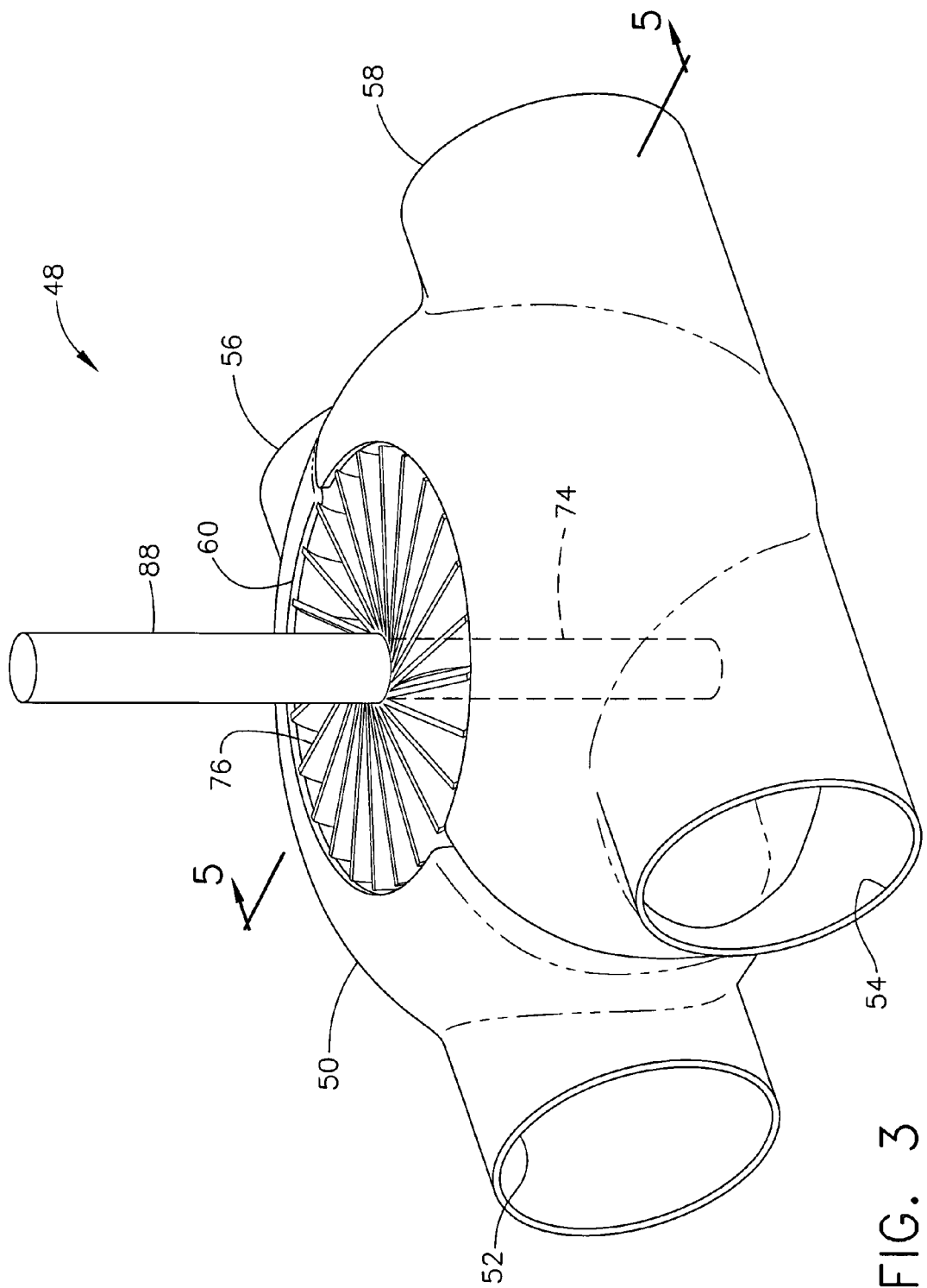
FIG. 3 is a perspective of a radial inflow turbine of the aircraft according to the present invention.

The aircraft 10 includes a radial inflow turbine, generally designated by 48, mounted on the airframe 12 in fluid communication with the power plants 32, 34 for receiving exhaust from the power plants. The radial inflow turbine 48 is mechanically connected to the rotor/wing 36 and converts exhaust from the power plants 32, 34 to mechanical power for rotating the rotor/wing during operation of the aircraft 10. Losses incurred in converting the exhaust to mechanical power for rotating the rotor/wing 36 are generally lower than the losses incurred between the power plant(s) and the rotor/wing in a conventional reaction-drive rotor/wing system. The higher efficiency of the radial inflow radial inflow turbine 48 system according to the present invention enables high performance and uses less power than is required for reaction-drive systems. As shown in FIG. 3, the radial inflow radial inflow turbine 48 includes a body or housing 50 forming a first inlet 52 and a second inlet 54. As shown in FIG. 1, the first and second inlets 52, 54 are in fluid communication with the first and second power plants 32, 34, respectively. The turbine body 50 also forms a first aft outlet 56 and a second aft outlet 58 downstream from the first and second inlets 52, 54, respectively.

Figure 4:
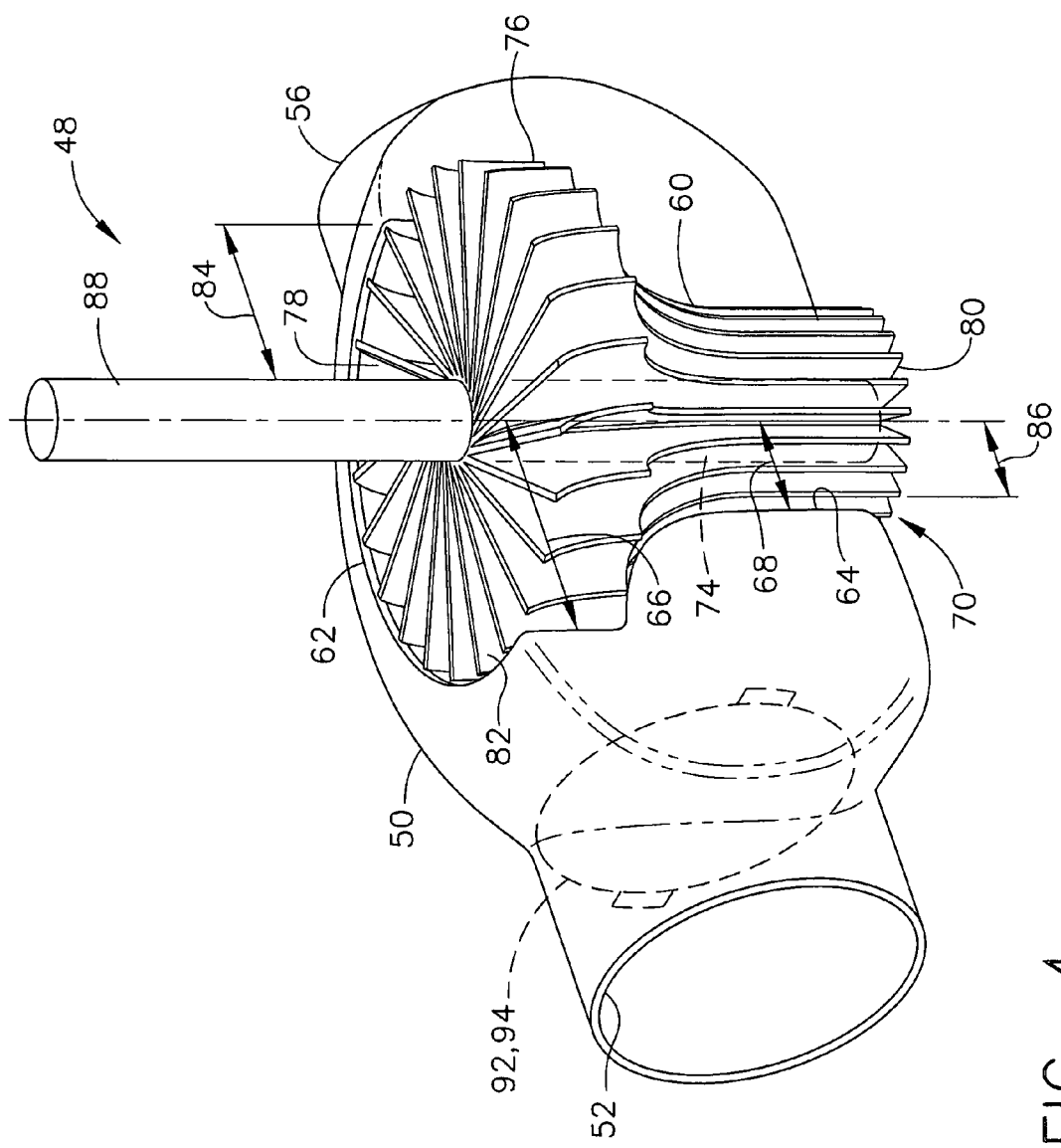
FIG. 4 is a perspective of the radial inflow turbine shown without half of a body of the radial inflow turbine.

In addition, the turbine body 50 forms an annular vortical plenum or chamber 60 in fluid communication with the inlets 52, 54 and outlets 56, 58. As shown in FIG. 4, the vortical chamber 60 has an upper portion 62 and a lower portion 64. Although the upper portion 62 of the vortical chamber 60 may have other minimum radii 66 without departing from the scope of the present invention, in one embodiment the upper portion has a minimum radius of between about 30 inches and about 36 inches. Although the lower portion 64 of the vortical chamber 60 may have other maximum radii 68 without departing from the scope of the present invention, in one embodiment the lower portion has a maximum radius of between about 12 inches and about 18 inches. The radial inflow radial inflow turbine 48 further includes a chamber outlet 70 downstream from the vortical chamber 60. Exhaust from the power plants 32, 34 passing through the vortical chamber 60 exits the radial inflow turbine 48 with reduced energy by way of the chamber outlet 70. Upon exiting the chamber outlet 70, the exhaust flows into a low-energy conduit 72, as shown in FIG. 1.

The radial inflow turbine 48 also includes a hub 74 rotatably connected to the turbine body 50 and a plurality of vanes 76 extending radially outward from the hub. The hub 74 and the vanes 76 are positioned in the turbine vortical chamber 60. Each of the vanes 76 includes a top 78 positioned in the upper portion 62 of the vortical chamber 60 and a bottom 80 positioned in the lower portion 64 of the vortical chamber. Each vane 76 is pitched from its top 78 to its bottom 80. As will be appreciated by those skilled in the art, the pitch of the vanes 76 creates an oblique surface 82 against which power plant 32, 34 exhaust is directed to cause the vanes 76 and hub 74 to rotate during operation of the aircraft 10 in the rotary-wing mode. In one embodiment, each vane 76 has a maximum radius 84 corresponding to the minimum radius 66 of the upper portion 62 of the vortical chamber 60 and a minimum radius 86 corresponding to the maximum radius 68 of the lower portion 64 of the vortical chamber. The radial inflow turbine 48 further includes a turbine shaft 88 operatively connected to the turbine hub 74 and to the rotor/wing drive shaft 38. In one embodiment, the rotor/wing drive shaft 38 and the turbine shaft 88 are integrally formed. The turbine hub 74, the vanes 76, and the turbine shaft 88 rotate together and the rotor/wing 36 is rotated by torque received from the turbine shaft during operation of the aircraft 10.

As shown in FIG. 1, the aircraft 10 may include a gearbox 90 connected to the turbine shaft 88 and the rotor/wing drive shaft 38 for transmitting power transferred from the turbine shaft to the drive shaft. In one embodiment, the gearbox 90 is a reduction gearbox for reducing the power and rotational speed imparted to the drive shaft 38 from the turbine shaft 88. In one embodiment, the gearbox 90 is a planetary gearbox. Although other types of gearboxes 90 may be used without departing from the scope of the present invention, in one embodiment the gearbox is an accessory gearbox available from Northstar Aerospace Inc of Bedford Park, Ill. The gearbox 90 may have one or more stages and although the gearbox 90 may have other reduction ratios without departing from the scope of the present invention, in one embodiment the gearbox has a reduction ratio of between about 7:1 and about 9:1.

Figure 5:
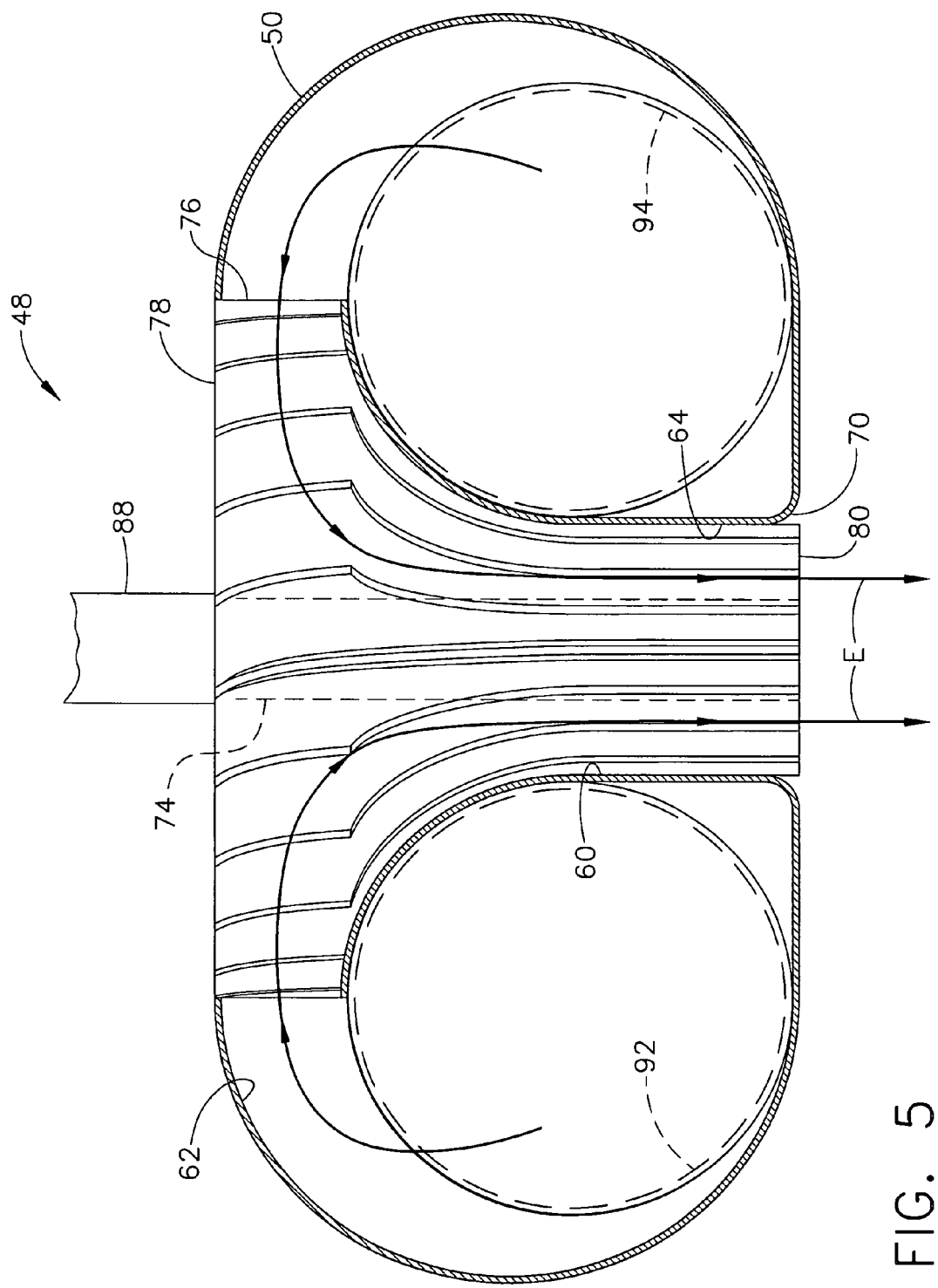
FIG. 5 is a cross section taken along lines 5-5 of FIG. 3.

As shown in FIGS. 4 and 5, the radial inflow turbine 48 further includes an inlet valve 92, 94 positioned within the turbine body 50 adjacent to each inlet 52, 54. Although the inlet valves 92, 94 may be other types without departing from the scope of the present invention, in one embodiment each valve is a butterfly valve (also known as a sliding door valve) or a ball valve. The inlet valves 92, 94 selectively allow power plant 32, 34 exhaust to pass through the turbine body 50 from the respective inlet 52, 54 to the corresponding aft outlet 56, 58, bypassing the vortical chamber 60, during high-speed flight in the fixed-wing mode or direct the exhaust through the vortical chamber 60 for flight in the rotary-wing mode. For directing power plant 32, 34 exhaust through the vortical chamber 60, the exhaust is first diverted from the respective inlet 52, 54 generally upward into the upper portion 62 of the vortical chamber 60 by the respective inlet valve 92, 94, then the exhaust flows generally radially inward in the vortical chamber and generally downward through the vortical chamber and against the oblique surfaces 82 of the vanes 76, as shown by arrow E in FIG. 5. Because of the radially inward entry of the exhaust into the vortical chamber 60, this type of turbine 48 is referred to as a radial inflow turbine. As described above, the exhaust flowing against the oblique surfaces 82 of the vanes 76 causes the vanes and turbine hub 74 to rotate thereby rotating the turbine shaft 88, the drive shaft 38, and the rotor/wing 36.

For embodiments having a single power plant (not shown), the radial inflow turbine 48 can be configured in a variety of ways. For example, the turbine 48 may include a sole inlet positioned at about a center of an upstream end of the turbine for transferring exhaust from a single power plant to the vortical chamber and a sole outlet positioned at about a center of a downstream end of the turbine. It is contemplated that in one embodiment (not shown), the exhaust from two or more power plants are combined upstream from the turbine and enter the turbine through a sole turbine inlet.

Figure 2:
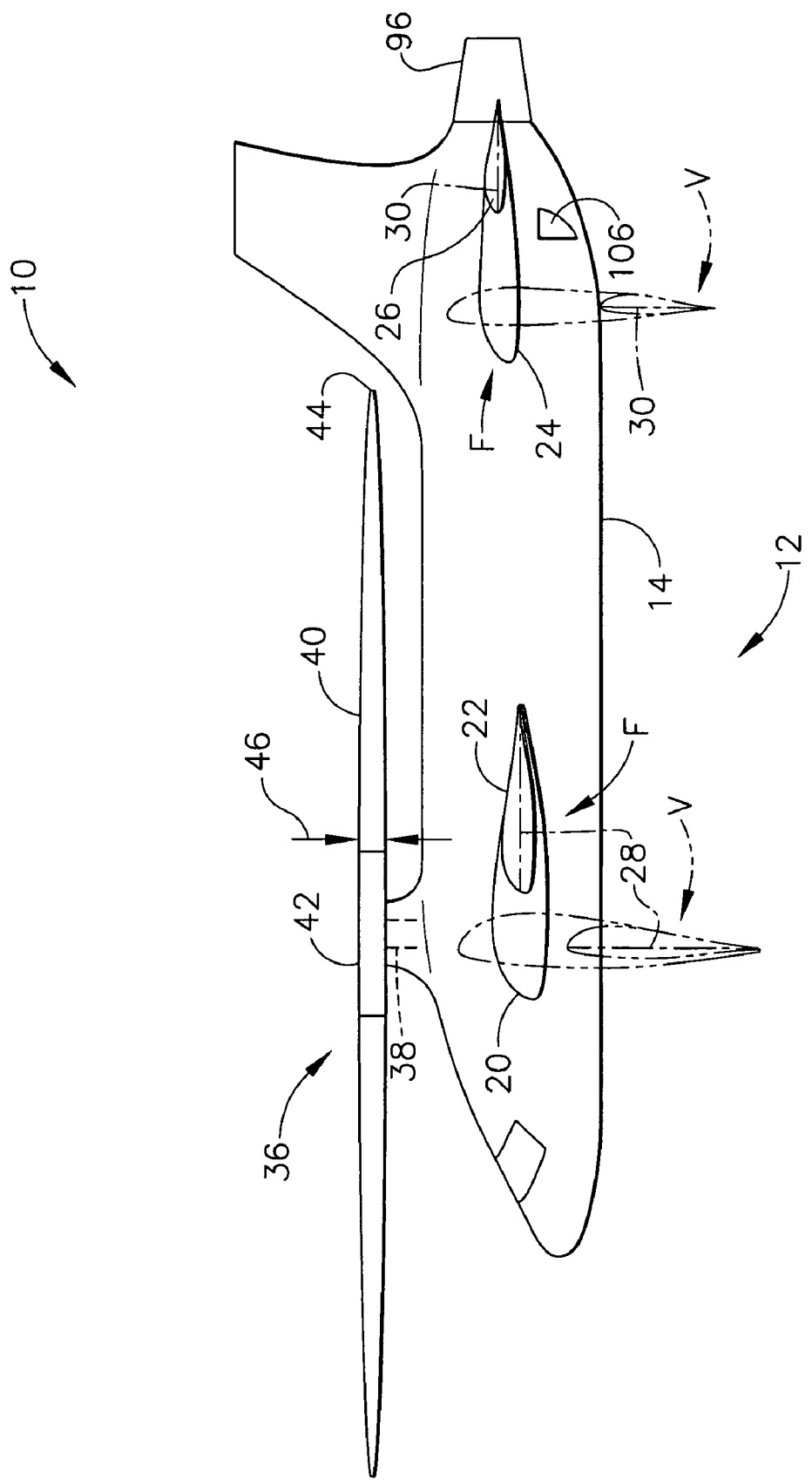
FIG. 2 is a side view of the aircraft according to the present invention.

As shown in FIGS. 1 and 2, the aircraft 10 further comprises a nozzle 96 mounted on the airframe 12 adjacent to the aft end 18 of the fuselage 14. The nozzle 96 is in fluid communication with the power plants 32, 34 for receiving exhaust. Specifically, the nozzle 96 is operatively connected to each aft outlet 56, 58 of the radial inflow turbine 48 for receiving power plant 32, 34 exhaust exiting the aft outlets for high-speed flight in the fixed-wing mode. For example, a high-energy conduit 98 (shown in FIG. 1) may connect the aft outlets 56, 58 to the nozzle 96. The nozzle 96 may also be operatively connected to the chamber outlet 70 for receiving exhaust during aircraft 10 operation. For example, the aircraft 10 may further comprise a conduit valve 100 for selectively diverting exhaust flowing through the low-energy conduit 72 to the high-energy conduit 98 and to the nozzle 96.

As shown in FIG. 1, the aircraft 10 also comprises an anti-torque and yaw control system, generally designated by 102, mounted on the airframe 12 adjacent to the aft end 18 of the fuselage 14. The anti-torque and yaw control system 102 is in fluid communication with the power plants 32, 34 for receiving exhaust for actively controlling yaw. Specifically, the anti-torque and yaw control system 102 is operatively connected to the chamber outlet 70 by way of the low-energy conduit 72 for receiving power plant 32, 34 exhaust exiting the radial inflow turbine 48 through the chamber outlet during aircraft 10 operation. The anti-torque and yaw control system 102 may also be operatively connected to the aft outlets 56, 58 for receiving exhaust during aircraft 10 operation. For example, the conduit valve 100 may be configured for selectively diverting exhaust flowing through the high-energy conduit 98 to the low-energy conduit 72 during aircraft 10 operation. Anti-torque and yaw control may be needed to control aircraft 10 yaw during operation in the rotary-wing mode. Although the anti-torque and yaw control system 102 may be other types without departing from the scope of the present invention, in one embodiment (not shown) the anti-torque and yaw control system is a NOTAR system available from the Boeing Company of Chicago, Ill. NOTAR is a federally registered trademark of the Boeing Company. In one embodiment, the anti-torque and yaw control system 102 includes right and left lateral outlets 104, 106 connected by a valve 108. The anti-torque and yaw control system valve 108 is controlled to selectively direct exhaust received from the low-energy conduit 72 to the right lateral outlet 104, to the left lateral outlet 106, or to both lateral outlets to control 10 yaw during operation of the aircraft 10.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. An aircraft comprising:
    an airframe having a fuselage extending between a forward end and an aft end;
    a power plant mounted on the airframe producing exhaust during operation thereof;
    a stoppable rotor/wing including a plurality of blades connected to a drive shaft rotatably mounted on the airframe, wherein the plurality of blades are positioned for providing thrust, lift, or both for selectively facilitating aircraft hover or forward flight; and
    a radial inflow turbine mounted on said airframe in fluid communication with said power plant for receiving exhaust from the power plant, said turbine including:
        a body forming an annular vortical chamber having an upper portion and a lower portion;
        a hub rotatably connected to the body and operatively connected to the drive shaft;
        a plurality of vanes extending radially outward from said hub, the hub and the vanes being positioned in said vortical chamber;
        an inlet for receiving the exhaust from the power plant, wherein said vortical chamber is in fluid communication with said inlet;
        an aft outlet downstream from said inlet;
        a chamber outlet downstream from said vortical chamber; and
        a valve positioned adjacent to said inlet, the valve selectively allowing the exhaust to pass through the turbine to the aft outlet or diverting the exhaust through the vortical chamber and out of the chamber outlet.

2. An aircraft as set forth in claim 1 further comprising:
    a gearbox connected to said turbine hub and said drive shaft for controlling an amount of power transferred from the turbine hub to the drive shaft.

3. An aircraft as set forth in claim 1 wherein:
    the upper portion of the vertical chamber has a maximum radius that is greater than a maximum radius of the lower portion of the vortical chamber; and
    each of the said vanes has a maximum radius corresponding to the maximum radius of the upper portion of the vortical chamber and a minimum radius corresponding to the maximum radius of the lower portion of the vortical chamber.

4. An aircraft as set forth in claim 1 wherein:
    each vane includes a top positioned in the upper portion of the vortical chamber and a bottom positioned in the lower portion of the vortical chamber; and
    each vane is pitched from its top to its bottom.

5. An aircraft as set forth in claim 1 further comprising an anti-torque and yaw control system mounted on the airframe adjacent to the aft end of the fuselage, wherein the aft outlet and the chamber outlet of said turbine are in fluid communication with said anti-torque and yaw control system for transferring exhaust from the turbine to the anti-torque and yaw control system during operation of the aircraft.

6. An aircraft as set forth in claim 1 wherein said power plant is a first power plant, said aircraft further comprises:
- a second power plant mounted on the airframe producing exhaust; and
- the turbine further includes:
  - a first inlet and a second inlet downstream from said first power plant and said second power plant, respectively for receiving exhaust from the power plants;
  - a first aft outlet and a second aft outlet downstream from said first inlet and said second inlet, respectively;
  - a chamber outlet downstream from said vortical chamber; and
  - a valve positioned adjacent to each inlet for selectively directing the exhaust from the corresponding power plant to the corresponding aft outlet or through the vortical chamber and out of the chamber outlet.

7. An aircraft as set forth in claim 6 further comprising an anti-torque and yaw control system mounted on the airframe adjacent to the aft end of the fuselage, wherein the aft outlets and the chamber outlet of said turbine are in fluid communication with said anti-torque and yaw control system for transferring exhaust from the turbine to the anti-torque and yaw control system during operation of the aircraft.

* * * * *